UNITED STATES PATENT OFFICE.

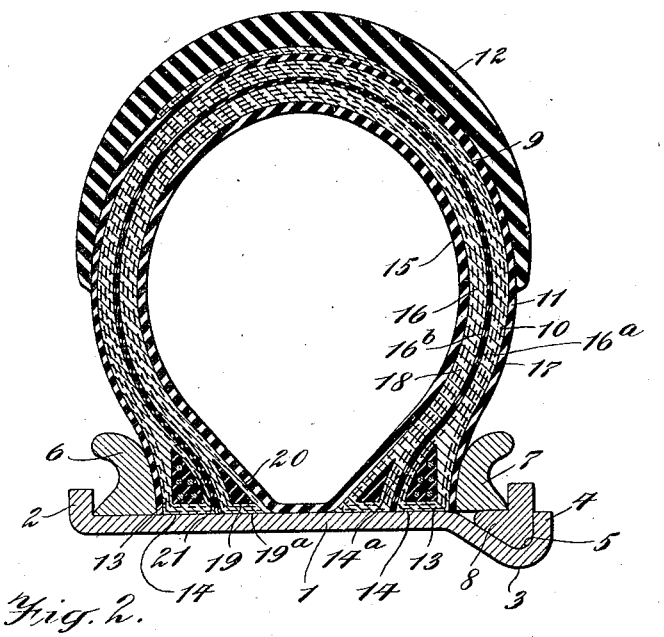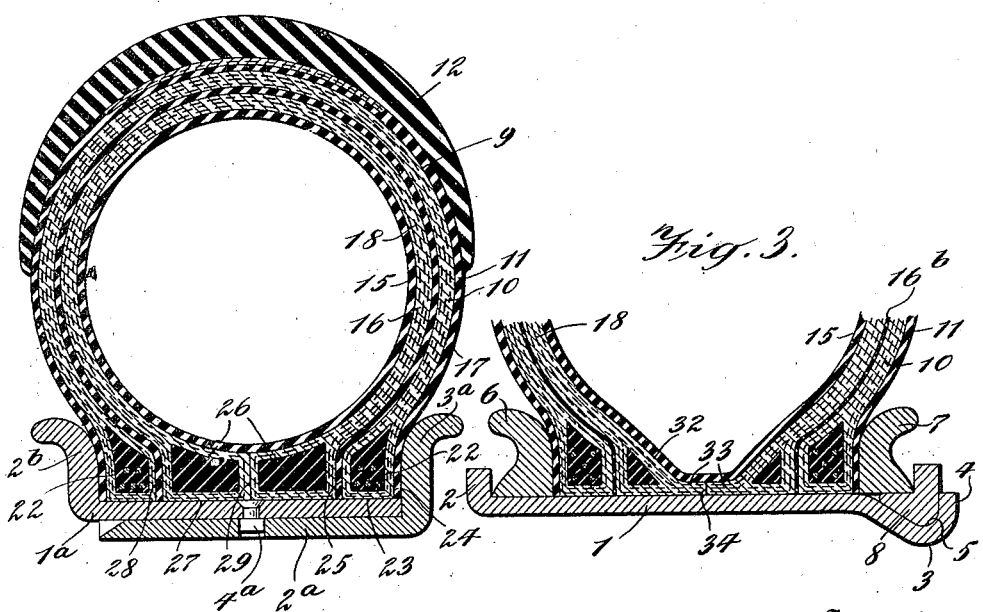

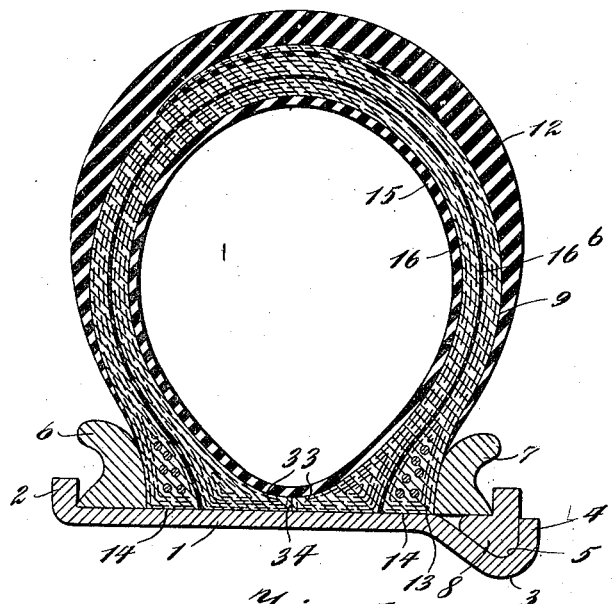
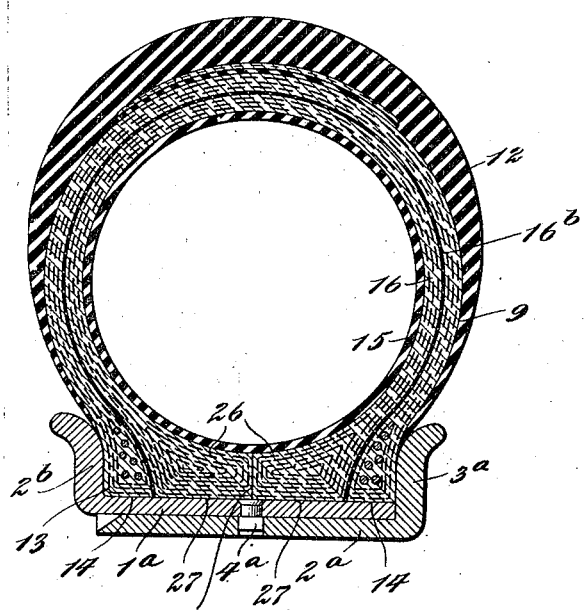

ELIAS HICKS HERRICK, OF NEW YORK, N. Y.

PNEUMATIC TIRE.

1,199,892.  Specification of Letters Patent.  Patented Oct. 3, 1916.

Application filed May 1, 1915. Serial No. 25,094.

*To all whom it may concern:*

Be it known that I, ELIAS HICKS HERRICK, a citizen of the United States, residing at New York city, borough of Manhattan, in the county of New York and State of New York, have invented certain new and useful Improvements in Pneumatic Tires, of which the following is a specification.

My invention relates to new and useful improvements in pneumatic tires of that character or type embodying an inner inflatable air containing means, and an outer wearing shoe or carcass inclosing the inflatable means and held on a wheel rim or a metallic rim adapted to be mounted on the felly of a wheel.

An important object of the invention, among others, is to provide a tire of the type stated which will have increased strength and wearing qualities and also be suitable for use on the types of standard rims. I accomplish this object by providing a tire in which the outer shoe is substantially relieved of the expansive force exerted by the inflatable container when inflated, so that the outer wearing shoe is not subjected when in use to the high tension existing in tires of which I am aware, and I employ for this purpose an inner shoe made of substantially inextensible and non-stretchable material molded or otherwise formed to a practically permanent form so as not to be altered in shape or size under the pressure incident to the use thereof, and located between the inner inflatable container and the outer shoe. This is of great advantage because it is well known that rubber structures, or those embodying rubber, cut or rupture more easily when under high tension.

I am aware that prior to my invention attempts have been made to construct a tire with an inner casing located between the outer covering and an inner air container, but as far as I am informed these tires have all been objectionable and unsuited for duties resulting from hard usage and heavy loads because this inner casing has not been of such construction as will effectually relieve the outer shoe of internal pressure, and retain its original form with substantial permanence so that outer shoes may be interchanged with the assurance of a proper fit, or such tires have been so complicated as to details of construction as to preclude economical manufacture, and satisfactory performance in use as regards accessibility for repair, wearing qualities and convenience in assembling. Another objection to such tires is that they are not suitable for use upon well known forms of rims accepted as standard in automobile manufacture.

The mere presence of a liner or inner casing is not in and of itself sufficient to obtain in an automobile tire the efficient results possible by my invention as regards greatly increased strength, resiliency and proper absorption and distribution of the pressure, and increased wearing capacity of the outer shoe as regards resistance and also longevity of use.

The inner casing must be of a construction which will sustain the load and retain a determined permanent form and size throughout not alterable due to expansion or use, and in order that interchangeability of outer shoes will be practicably possible in connection with the same inner shoe.

The invention consists in the improvements to be fully described hereinafter and the novelty of which will be particularly pointed out and distinctly claimed.

I have fully and clearly illustrated my invention in the accompanying drawings to be taken as a part of this specification, and wherein:

Figure 1 is a cross section through a tire construction embodying my present invention. Fig. 2 is a cross section through a tire showing another embodiment of the same invention. Fig. 3 is a cross section through a tire showing a third embodiment of the same invention. Fig. 4 is a cross section through another embodiment of the same invention. Fig. 5 is a cross section through a further embodiment of the same invention.

Referring to the drawings by characters of reference: 1 designates a metallic rim adapted to serve as a support and carrier for the improved tire constituting my invention. Along one circumferential edge, this rim is provided with a flange 2, which may be integral with the body of the rim, as shown. The opposite circumferential edge of the rim from that at which the flange 2 is located is depressed toward the axis of the rim, as at 3, and is provided with a flange 4, thereby forming a circumferential locking groove 5. The rim is also provided with a continuous tire locking ring 6 held in place against lateral displacement by the flange 2, a locking ring 7 being also located at the opposite edge of the rim and held in place by a flanged split locking ring 8 adapted to be seated in the groove 5 beneath said ring 7.

While I show my invention applied to well known types of demountable or detachable rims I desire it understood that I do not so limit my invention as it may be applied to a rim forming a permanent part of a wheel structure.

In Fig. 1 of the drawings, 9 designates an outer wearing shoe or carcass consisting of an envelop made up of superposed layers of fabric 10 and rubber 11, and provided with an overlying wear tread 12. The sides or wings of this shoe 9 are provided at their inner respective free edges with circumferential stiffened beads 13, which are substantially inextensible lengthwise and are each provided in the direction of the hub with a flat face 14 adapted to rest upon the periphery of the rim, the inextensibility of the edges of the shoe preventing the outer shoe from becoming loose on the rim and resulting in an improper fit. The inner faces of the outer shoe adjacent the beads are formed with convexly curved surfaces $14^a$ for a purpose to be presently set forth. The outer faces of the outer shoe 9 adjacent the beads 13, respectively abut the rim rings 6, 7, which limit the outward lateral movement of said beads. The beads 13 are so proportioned and the arrangement is such that, when the shoe 9 is in place, the said beads will be spaced from each other transversely of the rim.

15 designates an inner inflatable air container preferably in the form of a rubber inner tube, which, when inflated, provides the air cushion for the tire, the innermost portion of the container, when inflated, pressing toward the outer surface of the rim.

Means is provided whereby the function of the inner tube—namely, to provide a non-leakable air cushion, and the functions of the outer shoe to protect the inner tube and provide the wear resisting element are separated so that the outer shoe is relieved from the tension which would be caused if it were subjected to the full air pressure of the inner tube. I accomplish this result by providing means for resisting and absorbing the high pressure exerted by the inner tube so that a substantial portion of the pressure is not exerted upon the outer wearing shoe of the tire. This means I prefer to make in the form of a restraining member lying between the inner tube and the outer shoe and preferably in the nature of an inner shoe 16 formed of layers of rubber 17 and fabric 18, said inner shoe extending around the inner tube 9 between the latter and the outer shoe, and having its inner circumferential free edges provided each respectively with a substantially non-extensible bead 19 which beads rest on the rim between the beads on the outer shoe and that part of the inner tube which is adjacent to or contacts the rim. The beads 19 are flat on their faces which rest on the rim, as at $19^a$, and the inner face of the inner shoe may slope gradually from the inner edge of such face, as at 20. The outer face of the inner shoe adjacent the beads 19, is concavely curved, as at 21, so as to set over and receive the convexly curved portions $14^a$, heretofore described. When the inner tube is inflated it will be apparent that the beads of the inner shoe or restraining member will be held against outward lateral displacement by the beads of the outer shoe, and the inflation of the inner tube will force the beads on the inner shoe laterally against the beads of the outer shoe. This result is facilitated by the formation of the curved surfaces $14^a$ and 21, and the sloped or inclined surfaces 20. The inflation of the inner tube also assists in holding the beads on the inner shoe down on the rim. The beads 19 are made substantially nonextensible in order to hold the inner shoe 16 down on the rim and prevent the edges of said inner shoe from receding from the rim, and thereby assist in securing the advantages of the nonextensibility of the inner shoe in relieving the outer shoe of strains. In defining the edge of the inner shoe and the bead 19 as being substantially nonextensible I mean that said edge or bead is formed or constructed so that in use the circumference of the said edge or bead will not become enlarged by stretching so as to destroy the proper fit of the inner shoe on the rim, and result in displacement of the inner shoe so as to subject the outer shoe to strains. By this arrangement the inner shoe or restraining member is positively held so that it cannot creep and slip so as to uncover the inner tube at any point nor can the edges become released. This inner shoe is preferably so made as to be substantially inextensible and non-stretchable under the force exerted by the air container when inflated and in use, this being preferably accomplished by making the said inner shoe with a material, such as rubber impregnated fabric, which has been rendered inextensible by any suitable procedure such, for instance, as forming and stretching to a point where it will not appreciably stretch further upon subjection to the pressure of the air container when in use and "curing" in this state, so as to have the fabric retain its non-stretchable condition.

The important function of the non-extensible and non-stretchable condition of the inner shoe is that it sustains substantially all the force exerted by the air pressure, and in addition retains its original shape and size after continued use so that outer shoes of a standard size are interchangeable to fit said inner shoe, and may at any time be substituted for each other when through any cause replacement is required, with the assurance that the outer shoe will properly fit the inner shoe. By defining the inner shoe as being non-extensible or non-stretchable I do not mean fabric such as commonly employed in the shoes of tires in which there is a substantial percentage of stretchability permitting enlargement of the shoes, but by said term mean an inner shoe which is in such permanent form as not to become stretched or enlarged in use. This inner shoe is also constructed so as to be inelastic in the sense that the material thereof is not yielding so as to act as a cushion, but it is flexible throughout so as not to detract from the resiliency and yieldability of the inflated air container.

When the inner shoe embodies fabric as the strengthening means to resist expansion of the tire, the non-extensible and non-stretchable characteristics are not due to the fact that it has no further elasticity but to the fact that the strands of the fabric have been so rearranged as to prevent further extension by rearrangement of the strands. It is of course well known that tire fabric is usually made up of two sets of strands, which cross each other, and consequently the strands are not normally straight, but in side elevation have a wave-like form with upward and downward bends. When the fabric has been stretched as a fabric to substantially remove these bends, the strands will be substantially straight and, as strands, have not been stretched to or near the breaking point. They will then stand considerably more strain before reaching the breaking point without material elongation. The fabric as a fabric, however, has had substantially all of the stretch taken out of it.

In proportioning the outer shoe and the restraining member or inner shoe, the latter is made of such size that when the inner tube is inflated said restraining member will be subjected to substantially the entire air pressure exerted by the inner tube, while the outer shoe is made so as to be a fit to the outer surface of the restraining shoe when the latter is under tension by inflation of the inner tube. The inner shoe when including fabric having had substantially all of the stretch taken out of it and the outer shoe not having had substantially all the stretch taken out, it is apparent that if the inner shoe closely fitting the outer shoe, should expand under pressure to a very slight extent, the expansion would not be sufficient to do more than make a snug and tight fit between the shoes. No real strain will be on the outer shoe since the expansion will not be sufficient to even straighten out the bends in the strands composing the fabric of the outer shoe and much less to place any real tension on the strands themselves. It will be seen, therefore, that the outer shoe is relieved of the air pressure so that it is not placed under the usual high tension rendering it so sensitive to blows or impacts tending to cut or rupture it. It will also be seen that, in the event of the existence of a hole in the outer shoe or the weakening thereof, the inner shoe, being positively held in place by its beads, holds the outer shoe in its original position and prevents blow-outs, and that said inner shoe restrains the inner tube from bulging out into such hole or weakened parts. It will be noted that the inner faces of the inner shoe adjacent the beads incline toward the inner edges of the shoe forming acute angles with the flat faces which rest on the rim, this arrangement being important because no reëntrant space or recess is formed into which the air container when inflated may crowd so as to be cut or worn, or to prevent proper contact between the flat bead-faces and the flat surface of the rim.

In the form of the invention shown in Fig. 2, the construction of the inner tube, the restraining or inner shoe, and the outer shoe, are substantially the same as that heretofore described, except as to the formation and arrangement of the securing beads on the shoes. In this instance the beads on the outer shoe are shown at 22 and are formed with flat faces 23, adapted to rest on the rim, and outer and inner flat faces 24, 25, substantially at right angles to said faces 23, these beads being located with the outer faces 24 against the flanges of the rim, and the inner faces 25 being spaced from each other transversely of the rim. The inner shoe is provided with beads 26, each having a flat inner face 27 to rest on the rim, and flat outer and inner faces 28, 29, at right angles to the said faces 27. These beads 26 are so proportioned that when the tire is assembled, they lie on the rim in the space between the beads 22, and the faces 28 engage the faces 25. When the inner tube is inflated the air pressure forces the beads 26 down toward the rim, and said beads 26 hold the beads 22 in holding engagement with the locking rings or flanges on the rim. In this case, as well as in that form previously described, the inner shoe is proportioned to absorb and resist the air pressure, and the outer shoe is made a fit for the expanded inner shoe so as to be relieved of a great proportion of the internal pressure. In this Fig. 2 is shown a type of rim including two overlapping concentric members 1ª, 2ª, each having an outer flange 2ᵇ, 3ª, respectively, the inner member being a split ring held by dowel pins 4ª, one being shown in operative engagement with the outer member.

In Fig. 3 I have shown another form of the same invention in which the outer shoe and its securing ribs or beads may be the same as shown in Fig. 2. In this construction, however, I slightly vary the construction of the beads of the inner shoe or restraining member by forming the inner face of said beads on inclines substantially continuations of the inner surface of the inner shoe, as shown at 32, and provide circumferentially-extending webs or beads 33, which abut each other centrally of the rim, as at 34, and which assist in spacing the beads of the inner shoe and hold the inner tube off the rim, as in this construction the inner tube rests upon said webs or ribs 33, instead of directly contacting the outer surface of the demountable rim, or wheel rim.

In Fig. 4, the construction is substantially the same as that shown in Fig. 3, except that the outer shoe is formed more nearly like the construction shown in Fig. 1, the beads being slightly less in transverse diameter or thickness. In this Fig. 4, the outer faces of the beads on the inner shoe are made on concave curves to conform to the inner convex curves on the outer shoe beads, while the inner shoe beads are modified so that the inner faces of the spacing webs and the beads are formed on a gradual curve forming a continuation of the inner curved surface of the inner shoe.

I preferably make provision between the adjacent faces on the inner and outer shoes to waterproof and render impervious said contacting faces and obviate undue wear of the same. I accomplish this by providing the outer face of the inner shoe and the inner face of the outer shoe, as shown at 16ª, 16ᵇ, in Fig. 1, or either of said faces—for instance, that of the inner shoe, as shown at 16ᵇ, Figs. 3, 4 and 5, with a covering or coating of suitable material for the purpose, which may be preferably substantially pure rubber or material having the qualities of substantially pure rubber.

In Fig. 5, I have shown a modified form of my invention in which I combine an outer shoe of the same general contour and construction as shown in Figs. 1 and 4 with an inner shoe similar to that shown in Fig. 2.

What I claim and desire to secure by Letters Patent of the United States is:—

1. In combination, a wheel rim, an air container, an outer shoe having beads resting on the wheel rim, an inner shoe of less extensible material than the outer shoe between said container and said outer shoe, said inner shoe having nonextensible beads resting on the wheel rim between the outer shoe beads and in engagement with each other, and held laterally by the outer shoe beads.

2. In combination, a flat rim, an air container, an outer shoe having beads resting on the wheel rim, an inner shoe less extensible than the outer shoe between said container and said outer shoe, said inner shoe having nonextensible beads resting on the wheel rim and held thereon between the outer shoe beads by the air container, and held against outward lateral movement by the outer shoe beads.

3. In combination, a flat wheel rim having edge flanges, an air container, an outer shoe having reinforced edges resting on the rim and engaging the flanges and spaced from each other, an inner shoe less extensible than the outer shoe between said container and said outer shoe, said inner shoe having nonextensible edges resting on the wheel rim between the outer shoe edges and in engagement with each other and filling the space on the rim between said outer shoe edges and held against outward lateral movement thereby.

4. In combination, a flat wheel rim having edge flanges, an air container, an outer shoe having beads formed with convex inner and concave outer faces in cross section, and a flat face on the rim, said beads engaging the flanges and being spaced from each other, an inner shoe less extensible than the outer shoe between said container and said outer shoe, said inner shoe having nonextensible edges resting on the wheel rim between the outer shoe beads, and filling the space on the rim between said beads, and held against outward lateral movement thereby.

5. In combination, a flanged wheel rim, an air container, an outer shoe having stiffening beads having flat faces resting on the rim between the flanges, and having an inner convex face leading from the inner face of said shoe to the flat face on each bead, an inner shoe between the outer shoe and the air container, the outer surface of said inner shoe fitting the inner surface of the outer shoe and one of said surfaces being rubber coated, and said inner shoe having stiffening beads having flat faces resting on the wheel rim between the outer shoe beads and having an external concave face leading to each of said flat faces thereon and seated upon the convex faces in the outer shoe, the outer shoe being continuous and closed from bead to bead.

6. In combination, a flanged wheel rim, an air container, an outer shoe having stiffening beads having flat faces resting on the rim between the flanges, and having an inner convex face leading from the inner face of said shoe to the flat face on each bead, an inner shoe between the outer shoe and the air container and having stiffening beads having flat faces resting on the wheel rim between the outer shoe beads and having an external concave face leading to each of said flat faces thereon and seated upon the convex faces in the outer shoe, said beads on the inner shoe being held in position solely by the stiffened beads and the expansive force exerted by the inflated air container, said beads on the inner shoe having abutting faces preventing inward movement of said beads, the outer shoe being continuous and closed from bead to bead.

7. In combination, a wheel rim, an air container, an outer shoe having beads resting on the wheel rim, an inner shoe less extensible than the outer shoe between said container and said outer shoe, the outer face of the inner shoe contacting the inner face of the outer shoe and one of said faces having a coating of rubber, said inner shoe having nonextensible edges resting on the wheel rim between the outer shoe beads, and held laterally by the outer shoe beads.

8. A pneumatic tire adapted to be used on a wheel rim, and comprising an outer shoe having nonextensible edges adapted to rest on the wheel rim, an inner shoe less extensible than the outer shoe and adapted to receive an air-container, said inner shoe having nonextensible edges adapted to rest on the wheel rim between the outer shoe edges and held against outer lateral movement by the outer shoe edges, and from radial movement by their nonextensibility.

9. A pneumatic tire adapted to be used on a wheel rim, comprising an outer shoe having nonextensible edges adapted to rest on the wheel rim, an inner shoe less extensible than the outer shoe and adapted to receive an air-container, said inner shoe having nonextensible edges adapted to rest on the wheel rim between the outer shoe edges, said inner shoe edges abutting each other to prevent inward lateral movement thereof, and being held against outward lateral movement by the said outer shoe edges, the nonextensibility of said inner shoe edges preventing radial movement thereof.

10. A pneumatic tire adapted for use on a wheel rim having edge flanges, comprising an outer shoe having nonextensible edges adapted to rest on the rim and to engage the rim flanges and be spaced from each other, an inner shoe less extensible than the outer shoe and located in said outer shoe and adapted to receive an air-container, said inner shoe having nonextensible edges adapted to rest on the wheel rim between the outer shoe edges, and in engagement with each other and to fill the space on the wheel rim between said outer shoe edges and be held against outward lateral movement thereby.

11. A pneumatic tire adapted to be used on a flanged wheel rim, comprising an outer shoe having nonextensible beads having flat faces adapted to rest on the rim between the flanges, and having an inner convex face leading from the inner face of said shoe to the flat face on each bead, an inner shoe adapted to receive an air-container and having nonextensible beads having flat faces adapted to rest on a wheel rim between the outer shoe beads, and having an external concave face leading to each of said flat faces thereon and adapted to be seated upon the convex faces in the outer shoe, the inner edges of the inner shoe being held in position by the nonextensibility of its beads and the expansible force exerted in the air-container, said beads on the inner shoe having abutting faces preventing inward movement of said beads, the outer shoe being continuous and closed from bead to bead.

12. A pneumatic tire adapted to be used on a wheel rim having edge flanges, comprising an outer shoe having circumferentially stiffened and nonextensible edges resting on the rim and adapted to engage the rim flanges and be spaced from each other, an inner shoe less extensible than the outer shoe and located within said outer shoe, and adapted to receive an air-container, said inner shoe having nonextensible edges resting on the wheel rim between the outer shoe edges and in engagement with each other, said inner shoe edges being constructed to fill the space on the rim between said outer shoe edges and held against outward lateral movement thereby.

In testimony whereof I have hereunto signed my name in the presence of two subscribing witnesses.

ELIAS HICKS HERRICK.

Witnesses:
M. E. McNINCH,
C. G. HEYBURN.